Feb. 22, 1938.                B. T. KINNEAR                2,109,068
                              ANTISKID DEVICE
                            Filed March 6, 1937

Inventor.
Blanch T. Kinnear.
By
Chas. T. Hawley

Patented Feb. 22, 1938

2,109,068

UNITED STATES PATENT OFFICE 2,109,068

ANTISKID DEVICE

Blanch T. Kinnear, Still River, Mass.

Application March 6, 1937, Serial No. 129,463

5 Claims. (Cl. 152—14)

This invention relates to anti-skid chains such as are used on automobile tires under treacherous road conditions. Such chains commonly comprise two side chains and a plurality of cross chains, the side chains encircling the tire and the cross chains being disposed in spaced relation across the tread and between the side chains and being secured at their ends to said side chains. Such anti-skid chains are fairly efficient and satisfactory for increasing traction in mud or snow, but are less satisfactory on ice and do not effectively control side slip or skidding of an automobile.

It is the general object of my invention to provide improved means for attaching the cross chains to the side chains and furthermore to provide such attaching means with ice-engaging spurs or projections by which side slipping or skidding may be substantially eliminated.

A preferred form of the invention is shown in the drawing, in which

Figure 1:
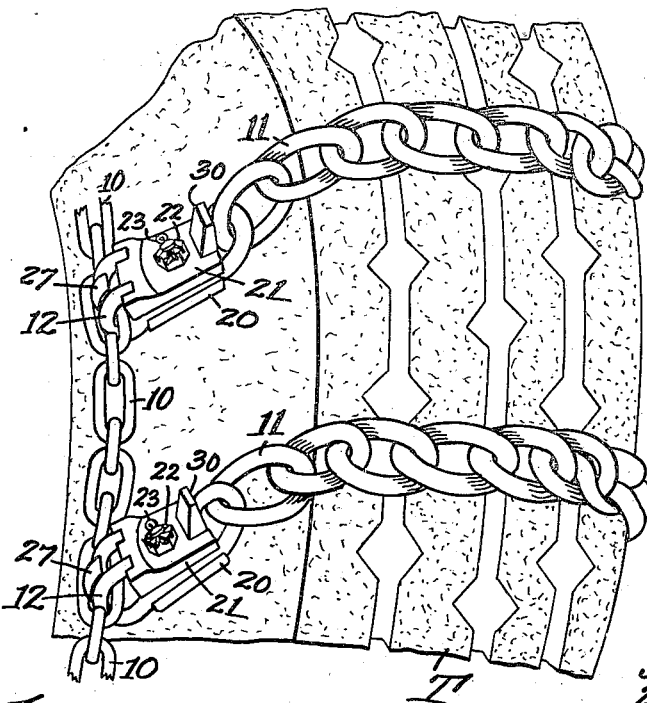
Fig. 1 is a perspective view showing a portion of a tire with my improved anti-skid chains applied thereto.
Figure 5:
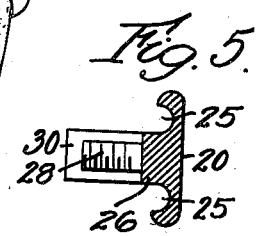
Fig. 5 is a detail sectional view, taken along the line 5—5 in Fig. 4.

Referring to the drawing, I have shown a portion of a pneumatic tire T of the type commonly used on automobiles, and I have shown mounted thereon a set of anti-skid chains comprising side chains 10 and a plurality of cross chains 11. It will be understood that a second side chain 10 (not shown) is provided at the opposite side of the tire T, and that the cross chains 11 are secured at both ends to said side chains.

The side chains 10 and cross chains 11 may be of usual commercial construction and the cross chains may be provided with hooks 12 at their ends which are also substantially of the usual construction, except that they are preferably of somewhat greater length to accommodate the attaching devices.

Figures 2, 3:
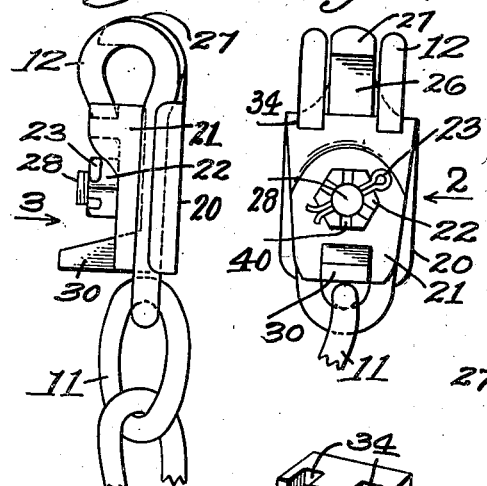
Fig. 2 is a side elevation of my improved attaching device, looking in the direction of the arrow 2 in Fig. 3.
Fig. 3 is a front elevation thereof, looking in the direction of the arrow 3 in Fig. 2.
Figure 4:
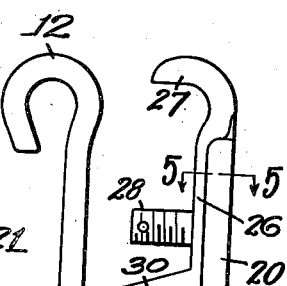
Fig. 4 is an exploded view showing the several parts of my attaching device separately positioned.
Figures 6, 7:
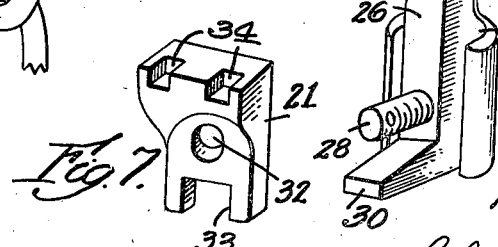
Fig. 6 is a perspective view of the base member of my improved attaching device.
Fig. 7 is a perspective view of the cap which forms the second part of the device.

The hooks 12 are inserted in links in the side chains 10 in the usual manner but the ends of the hooks are left open, as shown in Figs. 2 and 4, instead of being tightly closed down around the side chain links, which is the usual practice and which necessitates the use of tools and substantial force, both for closing and opening the hooks.

In order to secure the cross chains 11 and hooks 12 to the side chains 10, I provide a special attaching device for each hook 12. Each attaching device comprises a base member 20, a cap 21, a nut 22 and a cotter-pin 23.

The base member 20 and cap 21 are preferably formed as steel forgings of such composition that portions of the base member may be hardened if desired.

The base member 20 is longitudinally grooved, as indicated at 25, to receive the side portions of the hook 12, and the middle part 26 of the base member 20 is of such width as to fit loosely between the sides of the hook, as indicated in Fig. 3.

A hook-like projection 27 is formed at one end of the middle part 26 and projects upward between the ends of the hook 12 when assembled therewith. The middle portion 26 is also provided with a threaded stud 28 and with a wedge-like spur 30.

The cap 21 has an opening 32 to receive the stud 28, a recess 33 to clear the spur 30, and pockets 34 to receive the ends of the hook 12.

In assembling the cross chains with the side chains, a hook 12 is first inserted in a link of a side chain 10. A cap 21 is then placed on the hook 12, with the ends of the hook positioned in the pockets 34, and a base member 20 is then placed under the hook, with the stud 28 projecting through the opening 32 and with the hook-like portion 27 projecting through the link in the side chain 10. A nut 22 is then placed on the stud 28 and turned down to firmly secure the base member 20 and cap 21 in position. A cotter-pin 23 is then inserted in a cross opening in the stud 28 and in one of the notches 40 in the outer end of the nut 22.

When thus assembled, it will be evident that the cross chain is positively secured to each side chain and that the pull of the cross chain is distributed on the ends of the hook 12 and on the hook portion 27 of the base member 20.

The spur 30 is so positioned that it will clear the ground under normal running conditions but at the beginning of side slip or skidding, one or more spurs 30 will be drawn downward to such position as to engage the ice or other road surface and to strongly resist cross sliding or skidding of the car.

As chains are commonly used on both driving wheels and as at least three cross chains commonly engage the ground at all times, there will always be at least six of the spurs 30 which are so positioned that they can engage the ground and stop side slipping. If found desirable, the spurs 30 may be hardened to increase their wearing qualities.

By the use of my invention, I not only provide improved and convenient means for attaching or removing cross chains from side chains, but I also provide anti-skid spurs of such construction that they may be conveniently assembled and used with the ordinary commercial type of cross chain.

Having thus described my invention and the advantages thereof, I do not wish to be limited to the details herein disclosed, otherwise than as set forth in the claims, but what I claim is:—

1. In an anti-skid contrivance comprising side chains, cross chains and hooks for the ends of said cross chains, that improvement which consists in providing a separable device for securing each of said hooks in operative relation to its associated side chain, which separable securing device comprises a base member, a clamping cap and means to hold said parts in assembled relation with a hook and side chain, said base member having an anti-skid projection integral with that portion of the base member which is adjacent the end of the cross chain and said projection extending outward from said base member beyond said cap to ground-engaging position.

2. The combintion in an anti-skid contrivance as set forth in claim 1, in which the base member has a holding projection at one end engaging a link in said side chain.

3. The combination in an anti-skid contrivance as set forth in claim 1, in which the holding means comprises a threaded stud on said base member extending through said cap, a nut on said stud, and means to prevent displacement of said nut.

4. The combination in an anti-skid contrivance as set forth in claim 1, in which the cap has pockets to receive the open ends of a double hook.

5. The combination in an anti-skid contrivance as set forth in claim 1, in which the base member has longitudinal grooves for the side portions of a double hook and has a raised middle part fitting between said hook portions.

BLANCH T. KINNEAR.